(12) United States Patent
Taylor

(10) Patent No.: US 8,809,405 B2
(45) Date of Patent: Aug. 19, 2014

(54) METHOD FOR RECYCLING SYNTHETIC TURF AND PRODUCT

(75) Inventor: Leslie Jay Taylor, Acworth, GA (US)

(73) Assignee: TexTile Rubber & Chemical Co., Inc., Dalton, GA (US)

(*) Notice: Subject to any disclaimer, the term of this patent is extended or adjusted under 35 U.S.C. 154(b) by 118 days.

(21) Appl. No.: 13/481,179

(22) Filed: May 25, 2012

(65) Prior Publication Data

US 2012/0309858 A1    Dec. 6, 2012

Related U.S. Application Data

(60) Provisional application No. 61/491,954, filed on Jun. 1, 2011.

(51) Int. Cl.
*C08J 11/04* (2006.01)
*B09B 3/00* (2006.01)

(52) U.S. Cl.
CPC ........................................ *B09B 3/00* (2013.01)
USPC .................. 521/40; 521/41; 521/48; 521/49; 521/49.8; 525/70

(58) Field of Classification Search
CPC ........... C08J 11/00; C08J 11/06; B29B 17/00; C08I 51/06; B09B 3/00
USPC ........... 521/40, 40.5, 41, 48, 49, 49.8; 525/70
See application file for complete search history.

(56) References Cited

U.S. PATENT DOCUMENTS

| | | | |
|---|---|---|---|
| 5,086,105 A * | 2/1992 | Abe et al. | 524/492 |
| 2008/0260975 A1 | 10/2008 | Morton-Finger | |
| 2009/0172970 A1 | 7/2009 | Prieto et al. | |
| 2010/0151158 A1* | 6/2010 | Mashburn et al. | 428/17 |

FOREIGN PATENT DOCUMENTS

| | | | |
|---|---|---|---|
| EP | 2 186 942 A1 | 5/2010 | |
| JP | 2 080 018 A2 | 3/1990 | |

OTHER PUBLICATIONS

International Search Report and Written Opinion issued in counterpart PCT Application No. PCT/2012/039617 dated Aug. 8, 2012.

* cited by examiner

*Primary Examiner* — Frances Tischler
(74) *Attorney, Agent, or Firm* — Robert E. Richards

(57) ABSTRACT

The invention comprises a composition comprising the extrusion product of synthetic turf and a processing agent, whereby the extrusion product has a moisture content of less than 0.5% by weight. A process for making the composition is also disclosed.

12 Claims, No Drawings

METHOD FOR RECYCLING SYNTHETIC TURF AND PRODUCT

CROSS-REFERENCE TO RELATED APPLICATIONS

The present application claims the benefit of the filing date of U.S. Provisional Patent Application Ser. No. 61/491,954 filed Jun. 1, 2011.

FIELD OF THE INVENTION

The present invention generally relates to a method of recycling synthetic turf. More particularly, this invention relates to a method of recycling synthetic turf that is made from both thermoplastic and thermosetting materials, specifically thermoplastic face fibers, a thermoplastic primary backing material and a thermosetting polyurethane precoat on the backing material.

BACKGROUND OF THE INVENTION

In the plastics industry today there is a significant effort to reclaim, recycle and re-use all products made from plastics. This effort is due to rising cost of virgin polymers, the increased demand for plastics in a worldwide economy and an effort to reduce the amount of synthetic turf going to waste in landfills. As a result, plastic products today are being designed with recyclability in mind. Recycled plastics are being used to supplement or replace virgin polymers in new products to reduce raw material costs.

However, there are certain industries that are major users of plastics that have not designed their products with end-use recyclability in mind. One such major user of thermoplastic polymers is the synthetic turf industry. Synthetic turf has grown in popularity as a sports playing field surface and as alternative landscape material due to its low maintenance requirements and environmental advantages. There are over 5,000 sports fields nationwide that use synthetic turf as their playing surface today.

In the United States today, most synthetic turf is made with thermoplastic face fibers, such as polyethylene, polypropylene, nylon or combinations thereof, thermoplastic primary backing materials, such as polypropylene or polyester terephthalate or combinations thereof and thermosetting precoat materials, such as thermosetting polyurethane. While the thermoplastic materials used for the face fiber and primary backing material is easily recyclable, the thermosetting polymer used for the precoat is not. It is generally accepted in the industry today that thermosetting polymers cannot be recycled. Therefore, prior attempt to recycle synthetic turf have often included efforts to separate the thermoplastic material from the thermosetting material. However, processes used to separate thermoplastic and thermosetting materials are labor intensive, costly and inefficient.

It would therefore be desirable to provide a system for recycling synthetic turf. Specifically, it would be desirable to provide a system for recycling synthetic turf that is relatively easy and efficient to perform and recycles the entire synthetic turf product; i.e., recycle both the thermoplastic and the thermosetting materials together. It would also be desirable to provide a recycled synthetic turf product that can be used as a replacement for virgin thermoplastic polymers that does not require further processing to make the recycled product useful in other processes.

DETAILED DESCRIPTION OF THE DISCLOSED EMBODIMENTS

As used herein, the term "synthetic turf" means a surface material manufactured from synthetic fibers and made to look like artificial grass and is most often used in arenas or stadiums for sporting events or competitions that were originally or are normally played on grass. "Synthetic turf" as used here also means a surface material made partly from a thermoplastic polymer(s) and partly from a thermosetting polymer(s), for example thermoplastic face fibers, thermoplastic primary backing materials and thermosetting precoat materials. Furthermore, as used herein the term "synthetic turf" shall mean a surface material made from face fibers of polyethylene, polypropylene, nylon or combinations thereof, a primary backing material made from polypropylene or polyester terephthalate or combinations thereof and a precoat of thermosetting polyurethane. As used herein, the term "synthetic turf" also means the same thing as "artificial turf" and/or "artificial grass." Sports that are typically played on synthetic turf include, football, soccer, tennis, field hockey, and baseball.

There are generally two classes of synthetic turf: post-consumer synthetic turf and post-industrial synthetic turf. Post-consumer synthetic turf contains an infill material that needs to be removed. Post-industrial synthetic turf does not include this infill material. The infill material is typically made from a mixture of sand and cryogenically ground tire rubber. The infill is used in synthetic turf, inter alia, to provide a cushioned feel to the synthetic turf and to aid in making the blades of synthetic grass stand upright giving the grass a more natural appearance. To be recycled in the present invention, at least 90% by weight of the infill must be removed from post-consumer synthetic turf; preferably 95% by weigh of the infill must be removed from post-consumer synthetic turf. This means that post-consumer synthetic turf for use in the present invention should contain less than 10% by weight infill material, preferably less than 5% by weight infill material, especially no infill material. This further means that the product of the present invention can contain up to 10% by weight infill material, preferably up to 5% by weight infill material. There are several types of equipment on the market today for removing synthetic turf from an installation and removing infill from post-consumer synthetic turf. One such machine is the "Turf Muncher" available from Field Away, Dalton, Ga. The "Turf Muncher" both strips the synthetic turf from an installation and removes infill material therefrom. If a "Turf Muncher" is not available, the synthetic turf can be inverted; i.e., face fibers down, and the back of the turf can be beaten or vibrated so that the infill falls out of the turf.

After the infill material has been removed, if necessary, the synthetic turf is put through a size reduction process. The synthetic turf is fed into a shredder, grinder or chopper, which will reduce the synthetic turf to particles of a desired size. In the present invention, the synthetic turf should be reduced to particles no larger than about 1 inch in size; i.e., less than 1 inch in the largest dimension of an irregularly shaped particle. Suitable machines to perform this size reduction are available, such as the Series 13 and Series 14 Grinders from Jordan Reduction Solutions, Birmingham, Ala. or the series WLK25 shredder from Weima America, Inc of Fort Mill, S.C. Such grinders or choppers usually include a rotating drum with knives attached thereto for cutting the material fed therein into desired sizes. Grading screens below the rotating drum permit particles of only a desired size to pass through.

The ground particles of the synthetic turf are fed into the input of an extruder and blended in a molten state. The extruder can be either a single screw extruder or a twin-screw extruder. Furthermore, a twin-screw extruder can have either co-rotating or counter rotating screws. The extruder should include at least one side feeder for introducing at least one processing agent into the extruder along with the synthetic turf particles. A suitable extruder is commercially available under the designation Model G6000 from PTI Extruders of Aurora, Ill. Such extruders also include heated barrels for heating and/or melting the materials being processed therein. The barrel temperature can be adjusted to a desired temperature. For the present invention, the barrel temperature of the extruder should be hot enough to melt the thermoplastic polymers being processed therein, preferably approximately 325° F. to approximately 550° F., especially approximately 375° F. to approximately 450° F.

As the particles of the size reduced synthetic turf are being extruded through the extruder, a processing agent is introduced into and blended with the molten material in the extruder. The processing agent is introduced into the extruder and blended with the sized reduced synthetic turf at the rate of approximately 1% to approximately 30% by weight, preferably approximately 1% to 10% by weight, based on the weight of the size reduced synthetic turf. The use of the processing agent produces an extruded product that is visibly smoother and less porous than an extruded product that does not use the processing agent. More importantly, the use of the processing agent produces an extruded product that is much lower in moisture content than an extruded product that does not use the processing agent. The extruded blend of the size reduced synthetic turf and processing agent made in accordance with the present invention should have a moisture content of less than 0.5% by weight, preferably less than 0.4% by weight, especially less than 0.3% by weight. At these low moisture contents, the extruded products made in accordance with the present invention do not require drying in order to be further processable, such as by injection molding or sheet extrusion. An extruded size reduced synthetic turf product that does not include the processing agent will typically have a greater moisture content, such as greater than 0.7% by weight moisture, and must be dried to reduce the moisture content in order to be further processable, such as by injection molding or sheet extrusion.

The processing agent is preferably a thermoplastic polymer graft modified with maleic anhydride. Thermoplastic polymers useful as the backbone polymer include, but are not limited to, polymers of polypropylene, acrylate, high density polyethylene (HDPE), low density polyethylene (LDPE), linear low density polyethylene (LLDPE), ethylene-vinyl acetate (EVA), polypropylene random copolymer, ethylene propylene diene monomer (EPDM) rubber, ethylene propylene rubber grafted (EP) and mixtures thereof. A useful maleic anhydride grafted polymer is commercially available under the designation Westlake GA7502 from Westlake Chemical Corporation, Houston, Tex. Westlake GA7502 is a maleic anhydride modified methyl acrylate copolymer. Other useful processing agents include, but are not limited to, ethylene-ethyl acrylate (EEA) copolymer; ethylene-methyl acrylate (EMA) copolymer; ethylene-butyl acrylate (EBA) copolymer; acrylic acid modified copolymers; random terpolymers of ethylene, butyl acrylate and maleic anhydride; random terpolymers of ethylene, ethyl acrylate and maleic anhydride; random terpolymers of ethylene, methyl acrylate and glycidyl methacrylate; and copolymers of ethylene and glycidyl methacrylate.

The following examples are illustrative of selected embodiments of the present invention and are not intended to limit the scope of the invention.

EXAMPLE 1

A 2.5 inch pile height polyethylene face fiber synthetic turf with a polypropylene woven primary and a thermoset polyurethane precoat is selected for testing. The synthetic turf is comprised of 51% by weight polyethylene, 14% by weight polypropylene and 35% by weight thermoset polyurethane. The synthetic turf is removed from a sports facility using a Turf Muncher to strip the turf from the field, remove 95% by weight of the infill material and roll the turf into a roll. The carpet roll is cut into strips 36 inches wide. The strips are fed into a Series 14 Grinder from Jordon Reduction Solutions of Birmingham, Ala. grinder where the turf strips are ground/cut into particles having a maximum dimension of ⅜ inch. The size reduced synthetic turf is processed through a 4 inch single screw extruder with a 26:1 L/D at 400° F., which temperature is sufficient to melt the thermoplastic material from which the synthetic turf is made. The extruder is equipped with a 300 horsepower electric motor. The extruder is a Model 6 PM III from NRM Corporation from Columbiana, Ohio. The extruded molten polymer is pelletized under water using a Gala 6 underwater pelletizer manufactured by Gala Industries, Inc., Eagle Rock, Va. The resulting pellet is tested using ASTM D6980-09 "Test Method for Determination of Moisture in Plastics by Loss in Weight". Using the foregoing test procedure, the pellets produced in this test have a moisture content of >0.7% by weight.

An attempt is made to make a part by injection molding and to produce a sheet by sheet extrusion using pellets from this Example 1. Injection molding and sheet extrusion is unsuccessful using pellets from this example due to the relatively high moisture content of the pellets.

To be able to use the pellets from this example for injection molding or sheet extrusion or for the replacement of virgin polymers in similar manufacturing processes where the pellets are re-melted and molded in some fashion, the pellets would have to undergo a drying procedure to reduce their moisture content. Such a drying step adds additional cost and additional manufacturing problems to many processes.

EXAMPLE 2

The same procedure is followed as in Example 1, except 8.6% by weight of a maleic anhydride grafted polymer is added to the molten material during the extrusion process. The maleic anhydride grafted polymer is Westlake GA7502 from Westlake Chemical, which is a maleic anhydride modified methyl acrylate copolymer. Westlake GA7502 has a melt index of 16.0 g/10 min (measured in accordance with ASTM D 1238), a density of 942 kg/m3 (measured in accordance with ASTM D 4883), a methyl acrylate content of 20% by weight and a DSC melting point of 100° C. The extruded product is tested for moisture using ASTM D 6980-09. The extruded pellets are found to have a moisture content of <0.3% by weight.

An attempt is made to make a part by injection molding and to produce a sheet by sheet extrusion using pellets from this Example 2. Injection molding and sheet extrusion is successful using pellets from this example due to the relatively low moisture content of the pellets. Thus pellets made by this procedure can be used to replace virgin polymer in manufactured products. In fact up to 100% by weight of the recycled polymer can be used in manufactured products without any additional drying of the pellets.

EXAMPLE 3

The same procedure is followed as in Example 2, except the processing agents listed in Table 1 below are used instead of the Westlake GA7502 and in the amounts shown in the Table.

TABLE 1

| Compound | Amount (wt. %) | Manufacturer |
|---|---|---|
| Maleic anhydride graft modified polypropylene copolymer | 9.8 | Polybond 3002 Chemtura Corporation Middlebury, CT |
| Maleic anhydride graft modified high density polyethylene copolymer | 8.5 | Amplify GR205 The Dow Chemical Company Midland, MI |
| Maleic anhydride graft modified low density polyethylene copolymer | 8.5 | Amplify GR202 The Dow Chemical Company Midland, MI |
| Maleic anhydride graft modified linear low density polyethylene copolymer | 9.7 | Amplify GR207 The Dow Chemical Company Midland, MI |
| Maleic anhydride graft modified ethylene-vinyl acetate copolymer | 9.5 | Novacom HFS 500H PolyGroup Inc. Cincinnati, OH |
| Maleic anhydride graft modified polypropylene random copolymer | 9.5 | Fusabond MD353D Dupont Polymers Wilmington, DE |
| Maleic anhydride graft modified EPDM rubber | 9.4 | Optim P-635 Pluss Polymers Guragaon, India |
| Maleic anhydride graft modified ethylene propylene rubber grafted | 9.2 | Optim P-613 Pluss Polymers Guragaon, India |
| Ethylene-ethyl acrylate copolymer | 25 | Amplify EA103 The Dow Chemical Company Midland, MI |
| Ethylene-methyl acrylate copolymer | 25 | EMAC SP2207 Westlake Chemical Houston, TX |
| Ethylene-butyl acrylate copolymer | 25 | EMAC SP1806 Westlake Chemical Houston, TX |
| Acrylic acid modified Polypropylene Homopolymer | 12 | Polybond 1001 Chemtura Corporation Middlebury, CT |
| Random terpolymers of ethylene, butyl acrylate and maleic anhydride | 9.3 | Lotrader 3210 Arkema, Inc Philadelphia, PA |
| Random terpolymers of ethylene, ethyl acrylate and maleic anhydride | 9.3 | Lotrader 4700 Arkema, Inc Philadelphia, PA |
| Random terpolymers of ethylene, methyl acrylate and glycidyl methacrylate | 12 | Lotrader AX8900 Arkema, Inc Philadelphia, PA |
| Copolymers of ethylene and glycidyl methacrylate | 12 | Lotrader AX8840 Arkema, Inc Philadelphia, PA |

Pellets made by the process disclosed in Example 2 above by the extrusion of the synthetic turf and including the processing agents listed in Table 1 instead of Westlake GA7501 have sufficiently low moisture content that they can be successfully made into other products by injection molding and sheet extrusion.

It should be understood, of course, that the foregoing relates only to certain disclosed embodiments of the present invention and that numerous modifications or alterations may be made therein without departing from the spirit and scope of the invention.

What is claimed is:

1. A process comprising:
    size reducing synthetic turf;
    extruding the synthetic turf with a processing agent, whereby the extrusion product has a reduced moisture content of less than 0.5% by weight and wherein the processing agent a thermoplastic polymer graft modified with maleic anhydride.

2. The process of claim 1, wherein the moisture content is less than 0.4% by weight.

3. The process of claim 1, wherein the moisture content is less than 0.3% by weight.

4. The process of claim 1, wherein the thermoplastic polymer is polypropylene, acrylate, high density polyethylene (HDPE), low density polyethylene (LDPE), linear low density polyethylene (LLDPE), ethylene-vinyl acetate (EVA), polypropylene random copolymer, ethylene propylene diene monomer (EPDM) rubber, ethylene propylene rubber grafted (EP) or mixtures thereof.

5. The process of claim 1, wherein the processing agent is a maleic anhydride modified methyl acrylate copolymer.

6. The process of claim 1, wherein the processing agent comprises about 1% to about 30% by weight of the synthetic turf.

7. The process of claim 1, wherein the processing agent comprises about 1% to about 10% by weight of the synthetic turf.

8. The process of claim 1 further comprising removing at least 90% by weight infill material from the synthetic turf.

9. The process of claim 1 further comprising removing at least 95% by weight infill material from the synthetic turf.

10. A process comprising:
    extruding synthetic turf with a processing agent, whereby the extrusion product has a moisture content of less than 0.5% by weight;
    wherein the synthetic turf is made partially from one or more thermoplastic polymers and one or more thermosetting polymers; and
    wherein the processing agent is a maleic anhydride modified methyl acrylate copolymer and comprises about 1% to about 30% by weight of the synthetic turf.

11. The process of claim 10, wherein the moisture content is less than 0.4% by weight.

12. The process of claim 10, wherein the moisture content is less than 0.3% by weight.

* * * * *